United States Patent
Wang et al.

(10) Patent No.: US 10,318,081 B2
(45) Date of Patent: Jun. 11, 2019

(54) TOUCH DISPLAY DEVICE AND DRIVING METHOD THEREOF

(71) Applicants: Boe Technology Group Co., Ltd., Beijing (CN); Beijing Boe Optoelectronics Technology Co., Ltd., Beijing (CN)

(72) Inventors: Haisheng Wang, Beijing (CN); Xue Dong, Beijing (CN); Hailin Xue, Beijing (CN); Xiaochuan Chen, Beijing (CN); Shengji Wang, Beijing (CN); Xiaoliang Ding, Beijing (CN); Yingming Liu, Beijing (CN); Weijie Zhao, Beijing (CN); Changfeng Li, Beijing (CN); Wei Liu, Beijing (CN); Pengpeng Wang, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 256 days.

(21) Appl. No.: 15/516,072

(22) PCT Filed: Sep. 5, 2016

(86) PCT No.: PCT/CN2016/098042
§ 371 (c)(1),
(2) Date: Mar. 31, 2017

(87) PCT Pub. No.: WO2017/092460
PCT Pub. Date: Jun. 8, 2017

(65) Prior Publication Data
US 2019/0064955 A1    Feb. 28, 2019

(30) Foreign Application Priority Data
Dec. 4, 2015 (CN) .......................... 2015 1 0886172

(51) Int. Cl.
G06F 3/044 (2006.01)
G06F 3/041 (2006.01)

(52) U.S. Cl.
CPC ............ *G06F 3/044* (2013.01); *G06F 3/0412* (2013.01)

(58) Field of Classification Search
CPC .......... G06F 3/041–3/047; G06F 2203/04105; G06F 2203/04106; G09G 2300/02; G09G 2300/023; G09G 2300/026
See application file for complete search history.

(56) References Cited

U.S. PATENT DOCUMENTS

| 9,965,118 | B2 * | 5/2018 | Shepelev | ................ G06F 3/044 |
| 9,971,449 | B2 * | 5/2018 | Ding | ...................... G06F 3/047 |

(Continued)

FOREIGN PATENT DOCUMENTS

| CN | 102709309 | 10/2012 |
| CN | 204361102 | 5/2015 |

(Continued)

OTHER PUBLICATIONS

Second Office Action for Chinese Patent Application No. 201510886172.8 dated May 17, 2018.
(Continued)

*Primary Examiner* — Gene W Lee
(74) *Attorney, Agent, or Firm* — Calfee, Halter & Griswold LLP

(57) ABSTRACT

A touch display device and a driving method are disclosed. The touch display device includes a liquid crystal display panel having a plurality of self-capacitive electrodes and an electroluminescent display panel arranged under the liquid crystal display panel. The self-capacitive electrodes in the liquid crystal display panel and a cathode in the electroluminescent display panel constitute capacitive structures. The driving method includes in a touch detection time period, applying a first touch detection signal to the self-capacitive (Continued)

electrodes and the cathode simultaneously, and detecting change of a capacitance value of a self capacitance corresponding to each self-capacitive electrode so as to determine a touch position; and in a pressure detection time period, applying a second touch detection signal to the self-capacitive electrodes or the cathode, and detecting changes of capacitance values of capacitances formed between the self-capacitive electrodes and the cathode to determine a pressure at the touch position.

18 Claims, 4 Drawing Sheets

(56) References Cited

U.S. PATENT DOCUMENTS

| | | | |
|---|---|---|---|
| 2001/0028335 A1* | 10/2001 | Hasegawa | G02F 1/133621 |
| | | | 345/76 |
| 2014/0218334 A1 | 8/2014 | Shibata et al. | |
| 2016/0334903 A1* | 11/2016 | Shepelev | G06F 3/044 |
| 2017/0235414 A1* | 8/2017 | Ding | G06F 3/047 |
| | | | 345/174 |
| 2017/0262125 A1* | 9/2017 | Ding | G06F 3/044 |
| 2018/0018052 A1* | 1/2018 | Yang | G06F 3/0412 |
| 2018/0203569 A1* | 7/2018 | Ding | G06F 3/047 |

FOREIGN PATENT DOCUMENTS

| | | |
|---|---|---|
| CN | 105068695 | 11/2015 |
| CN | 105117065 | 12/2015 |
| CN | 105373281 | 3/2016 |

OTHER PUBLICATIONS

First Office Action for Chinese Patent Application No. 201510886172.8 dated Sep. 27, 2017.

International Search Report and Written Opinion from PCT/CN16/98042 dated Nov. 29, 2016.

* cited by examiner

TOUCH DISPLAY DEVICE AND DRIVING METHOD THEREOF

RELATED APPLICATIONS

The present application is the U.S. national phase entry of PCT/CN2016/098042, with an international filing date of Sep. 5, 2016, which claims the benefit of Chinese Patent Application No. 201510886172.8, filed on Dec. 4, 2015, the entire disclosures of which are incorporated herein by reference.

FIELD

This disclosure relates to the technical field of touch display, particularly to a touch display device and a driving method thereof.

BACKGROUND

Pressure sensing technology is a technology that can detect the external force. This technology had been applied in fields of industrial control, medical treatment, and so on. At present, in the field of display, particularly in the mobile phone or panel field, pressure sensing is achieved by adding an extra mechanism at the backlight portion of the liquid crystal display panel or the middle frame portion of the mobile phone. Such a design has to make modifications to the structural design of the liquid crystal display panel or the mobile phone. Moreover, because the assembly tolerance is relatively large, the detection accuracy in such a design is also limited.

SUMMARY

In view of this, embodiments of this disclosure provide a touch display device and a driving method thereof, for achieving three-dimensional detection function of the touch in the touch display device.

Embodiments of this disclosure provide a driving method of a touch display device. The touch display device comprises a liquid crystal display panel having a plurality of self-capacitive electrodes for performing black and white display, and an electroluminescent display panel arranged under the liquid crystal display panel for performing color display. The self-capacitive electrodes in the liquid crystal display panel and a cathode in the electroluminescent display panel constitute capacitive structures; the driving method includes in a touch detection time period, applying a first touch detection signal to the self-capacitive electrodes and the cathode simultaneously, and detecting change of a capacitance value of a self capacitance corresponding to each self-capacitive electrode so as to determine a touch position; in a pressure detection time period, applying a second touch detection signal to the self-capacitive electrodes or the cathode, and detecting changes of capacitance values of capacitances formed between the self-capacitive electrodes and the cathode so as to determine a pressure at the touch position.

In certain exemplary embodiments, the driving method further includes in the touch detection time period, applying a synchronization signal of a same amplitude as the first touch detection signal to a gate line and a data line in the liquid crystal display panel, and applying a synchronization signal of a same amplitude as the first touch detection signal to a pixel circuit in the electroluminescent display panel.

In certain exemplary embodiments of the driving method, applying a second touch detection signal to the self-capacitive electrodes or the cathode includes applying a second touch detection signal to the cathode, and applying a fixed value signal to the self-capacitive electrodes simultaneously. In certain embodiments, detecting changes of capacitance values of capacitances formed between the self-capacitive electrodes and the cathode includes detecting change of signal amount of each of the self-capacitive electrodes.

In certain exemplary embodiments of the driving method, applying a second touch detection signal to the self-capacitive electrodes or the cathode includes applying a fixed value signal to the cathode, and applying a second touch detection signal to the self-capacitive electrodes simultaneously. In certain embodiments, detecting changes of capacitance values of capacitances formed between the self-capacitive electrodes and the cathode includes detecting change of signal amount of each of the self-capacitive electrodes.

In certain exemplary embodiments of the driving method, the cathode in the electroluminescent display panel is a plurality of block electrodes. Moreover, the block electrodes and the self-capacitive electrodes are in one-to-one correspondence, and their orthographic projections on a horizontal plane overlap with each other. In certain embodiments, applying a second touch detection signal to the self-capacitive electrodes or the cathode includes applying a second touch detection signal to the self-capacitive electrodes, and applying a fixed value signal to the cathode simultaneously. In certain embodiments, detecting changes of capacitance values of capacitances formed between the self-capacitive electrodes and the cathode includes detecting change of signal amount of each of the block electrodes.

In certain exemplary embodiments of the driving method, the cathode in the electroluminescent display panel is a plurality of block electrodes. Moreover, the block electrodes and the self-capacitive electrodes are in one-to-one correspondence, and their orthographic projections on a horizontal plane overlap with each other. In certain embodiments, applying a second touch detection signal to the self-capacitive electrodes or the cathode includes applying a fixed value signal to the self-capacitive electrodes, and applying a second touch detection signal to the cathode simultaneously. In certain embodiments, detecting changes of capacitance values of capacitances formed between the self-capacitive electrodes and the cathode includes detecting change of signal amount of each of the block electrodes.

In certain exemplary embodiments the driving method further includes in the pressure detection time period, applying a same fixed value signal to the gate line and the data line in the liquid crystal display panel as the self-capacitive electrodes.

In certain exemplary embodiments the driving method further includes in the pressure detection time period, applying a synchronization signal of a same amplitude as the second touch detection signal to a pixel circuit in the electroluminescent display panel.

In certain exemplary embodiments the driving method further includes in the pressure detection time period, applying a synchronization signal of a same amplitude as the second touch detection signal to the gate line and the data line in the liquid crystal display panel.

In certain exemplary embodiments the driving method further includes in the pressure detection time period, applying a same fixed value signal to a pixel circuit in the electroluminescent display panel as the cathode.

In certain exemplary embodiments of the driving method, determining a touch pressure includes determining the touch pressure based on a difference between the change of signal amount of the self-capacitive electrode detected in the pressure detection time period and the change of signal amount of the self-capacitive electrode detected in the touch detection time period.

Embodiments of this disclosure further provide a touch display device that includes a liquid crystal display panel having a plurality of self-capacitive electrodes for performing black and white display; an electroluminescent display panel arranged under the liquid crystal display panel for performing color display, wherein the self-capacitive electrodes in the liquid crystal display panel and a cathode in the electroluminescent display panel constitute capacitive structures; a touch detection chip configured to in a touch detection time period, apply a first touch detection signal to the self-capacitive electrodes and the cathode simultaneously, and detect change of a capacitance value of a self capacitance corresponding to each self-capacitive electrode so as to determine a touch position; in a pressure detection time period, apply a second touch detection signal to the self-capacitive electrodes or the cathode, and detect changes of capacitance values of capacitances formed between the self-capacitive electrodes and the cathode so as to determine a pressure at the touch position.

In certain embodiments of the touch display device, the cathode in the electroluminescent display panel is a plurality of block electrodes. Moreover, the plurality of block electrodes and the self-capacitive electrodes are in one-to-one correspondence, and their orthographic projections on a horizontal plane overlap with each other.

DETAILED DESCRIPTION

Figure 1:
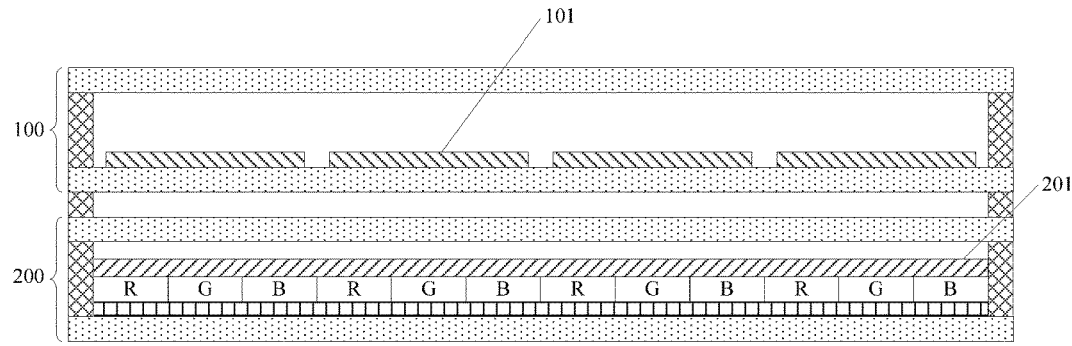
FIG. 1 is a schematic structural view of a touch display device provided by an embodiment of this disclosure.

This disclosure explains how to achieve pressure sensing with higher detection accuracy while making fewer modifications to the hardware of the display panel. The specific implementations of the touch display device and the driving method thereof provided by embodiments of this disclosure will be explained in detail with reference to the drawings.

The thickness and the shape of the respective film layers in the drawings do not reflect the real proportions, which only aim to schematically explaining the contents of the present disclosure.

In the liquid crystal display device, a color electroluminescent display panel is used to replace the conventional backlight can make the whole display device thin and can save the color filter in the liquid crystal display panel, thereby being benefit to improve optical transmittance of the liquid crystal display panel. The touch display device and the driving method thereof provided by embodiments of this disclosure achieve three-dimensional touch display exactly based on a display device structure in which the color electroluminescent display panel is used as the backlight of the liquid crystal display panel.

Embodiments of this disclosure provide a touch display device, as shown in FIG. 1, comprising:

a liquid crystal display panel 100 having a plurality of self-capacitive electrodes 101 for performing black and white display;

an electroluminescent display panel 200 arranged under the liquid crystal display panel 100 for performing color display, the self-capacitive electrodes 101 in the liquid crystal display panel 100 and a cathode 201 in the electroluminescent display panel 200 constitute capacitive structures;

a touch detection chip configured to: in a touch detection time period, apply a first touch detection signal to the self-capacitive electrodes 101 and the cathode 201 simultaneously, and detect change of a capacitance value of a self capacitance corresponding to each self-capacitive electrode 101 so as to determine a touch position; in a pressure detection time period, apply a second touch detection signal to the self-capacitive electrodes 101 or the cathode 201, and detect changes of capacitance values of capacitances formed between the self-capacitive electrodes 101 and the cathode 201 so as to determine a pressure at the touch position.

The electroluminescent display panel 200 serving as backlight and providing chromatic information can be manufactured using a conventional hard material, and can also be manufactured using a flexible material. Moreover, adhesive of a flexible material can be used to fix the electroluminescent display panel 200 and the liquid crystal display panel 100 above it, and a seal agent can also be used to fix the electroluminescent display panel 200 and the liquid crystal display panel 100 above it, which will not be defined here.

Figure 2:
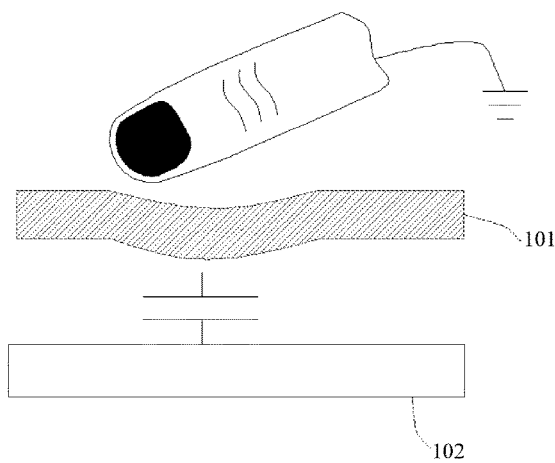
FIG. 2 is a schematic view of realizing pressure sensing by a touch display device provided by an embodiment of this disclosure.

In the touch display device provided by embodiments of this disclosure, as shown in FIG. 2, when pressing at the position where a self-capacitive electrode 101 in the liquid crystal display panel 100 is, the distance between the self-capacitive electrode 101 and the cathode 201 that constitute a capacitive structure changes, then the capacitance between the two changes, and thus the function of pressure sensing is achieved. The above solution makes less modification to the structural design of the touch display device, and will not be limited by assembly tolerance, which is benefit to achieve better detection accuracy and save the manufacturing cost.

In the touch display device provided by embodiments of this disclosure, the specific structure of a self-capacitive electrode 101 of the liquid crystal display panel 100 can be achieved in various ways. For example, the common electrode layer in the array substrate can be used to multiplex the self-capacitive electrodes, i.e., the respective self-capacitive electrodes constitute the common electrode layer on the array substrate. When the structure of the common electrode layer is modified and is segmented into the self-capacitive electrodes, on the basis of the existing manufacturing process of the array substrate, no extra process is required, which can save the production cost and improve the production efficiency. The following explanations are all made by taking the example that the self-capacitive electrodes multiplex the common electrode layer.

In the touch display device provided by embodiments of this disclosure, the cathode 201 in the electroluminescent display panel 200 can be a non-patterned surface electrode, or can be a plurality of block electrodes. Moreover, the plurality of block electrodes and the self-capacitive electrodes 101 are in one-to-one correspondence, and their orthographic projections on a horizontal plane overlap with each other.

Figure 3:
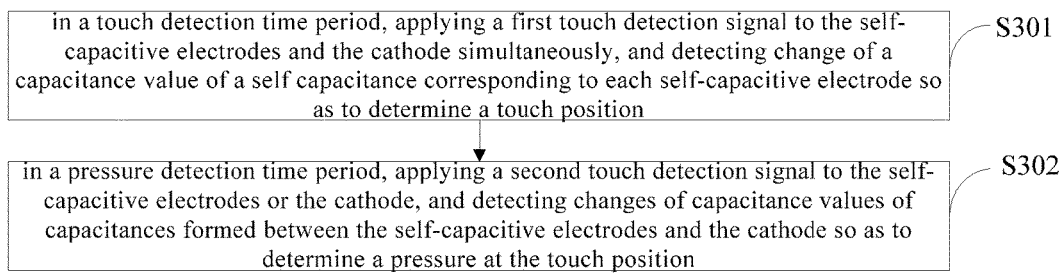
FIG. 3 is a schematic flow chart of a driving method of a touch display device provided by an embodiment of this disclosure.

Based on the same inventive concept, embodiments of this disclosure further provides a driving method of a touch display device, as shown in FIG. 3, comprising the steps of:

S301: in a touch detection time period, applying a first touch detection signal to the self-capacitive electrodes 101 and the cathode 201 simultaneously, and detecting change of a capacitance value of a self capacitance corresponding to each self-capacitive electrode 101 so as to determine a touch position;

S302: in a pressure detection time period, applying a second touch detection signal to the self-capacitive electrodes 101 or the cathode 201, and detecting changes of capacitance values of capacitances formed between the self-capacitive electrodes 101 and the cathode 201 so as to determine a pressure at the touch position.

In specific implementation, the first touch detection signal applied in step S301 and the second touch detection signal applied in step S302 can be same and can also be different in terms of signal frequency, duty ratio and amplitude, which will not be defined here.

In the driving method provided by embodiments of this disclosure, in order to reduce mutual interference between the display signal and the touch detection signal, in specific implementation, the manner of driving at different times has to be used in the touch and display phases, and the display driving chip and the touch detection chip can also be integrated into one chip so as to further reduce the production cost.

Figure 4:
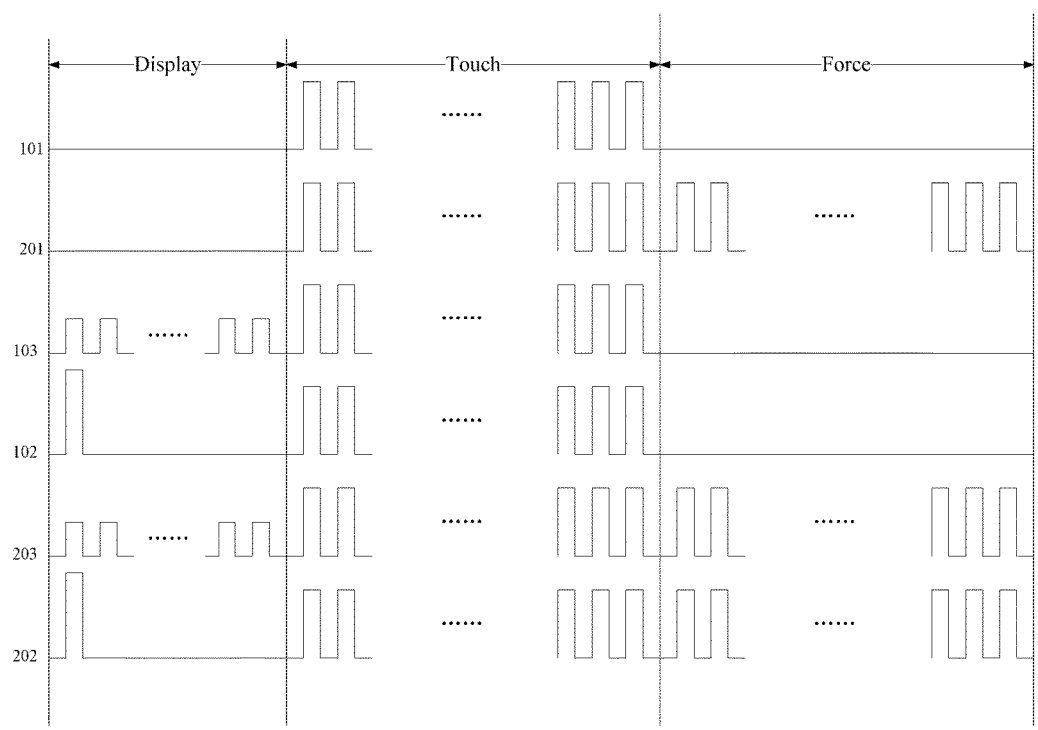
FIG. 4 and FIG. 5 are schematic driving timing diagrams of a touch display device provided by an embodiment of this disclosure respectively.
Figure 5:
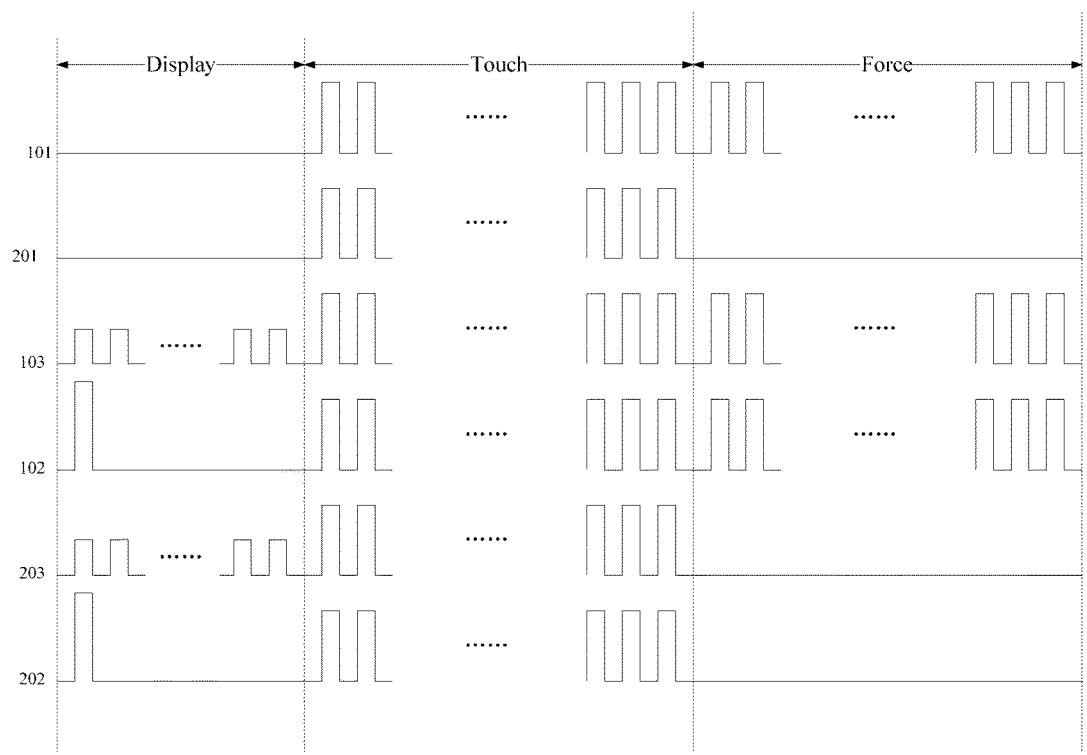

Specifically, in the timing diagrams as shown in FIG. 4 and FIG. 5, the time of each frame (V-sync) in the display device is generally divided into display time period (Display), touch detection time periods (Touch) and pressure detection time period (Force). The touch detection time period (Touch) can be set before the pressure detection time period (Force), and can also be set after the pressure detection time period (Force), which will not be defined here.

In the display time period (Display), a gate scanning signal is applied to each gate line 102 in the liquid crystal display panel successively. A gray scale signal is applied to a data line 103. When the common electrode layer is used to multiplex the self-capacitive electrodes 101, the touch detection chip connected with each self-capacitive electrode 101 applies a common electrode signal to the each self-capacitive electrode 101 respectively, so as to achieve liquid crystal display function. Meanwhile, a gate scanning signal is applied to each gate line 202 in the electroluminescent display panel 200 successively. A data signal is applied to a data line 203, and the electroluminescent display panel 200 is controlled to provide backlight and chromatic information.

At step 301 in the above driving method provided by embodiments of this disclosure, in the touch detection time period (Touch), as shown in FIG. 4 and FIG. 5, after a first touch detection signal is applied to each self-capacitive electrode 101, the touch detection chip can determine a two-dimensional coordinates of the touch point on the screen by detecting the change of the capacitance value of the self-capacitance corresponding to each self-capacitive electrode 101 caused by the capacitance of the human body in touch, i.e., determining the touch position. Moreover, as shown in FIG. 4 and FIG. 5, since the first touch detection signal is applied to the self-capacitive electrodes 101 and the cathode 201 simultaneously in this time period, the potential of the cathode 201 and the potentials of the self-capacitive electrodes 101 are same. Although the capacitive structures between the cathode 201 and the self-capacitive electrodes 101 exist, the change of the distance between the cathode 201 and a self-capacitive electrode 101 caused by touch and press will not bring charge and discharge of the capacitive structure formed between the two, i.e., it will not influence the first touch detection signal applied to the self-capacitive electrode 101, hence, the detected change of capacitance value of the self capacitance corresponding to the self-capacitive electrode 101 is completely caused by a finger touch.

Further, in the above driving method provided by embodiments of this disclosure, in the touch detection time period (Touch), in order to avoid generation of the ground capacitance between the gate line 102 and the data line 103 in the liquid crystal display panel and the self-capacitive electrodes 101 thereby influencing accuracy of the touch detection, in specific implementation, as shown in FIG. 4 and FIG. 5, a synchronization signal of the same amplitude as the first touch detection signal can be applied to the gate line 102 and the data line 103 in the liquid crystal display panel in the touch detection time period. In this way, the ground capacitance between the gate line 102 and the data line 103 and the self-capacitive electrodes 101 can be eliminated, which is convenient for improving accuracy of the touch detection.

Meanwhile, in the above driving method provided by embodiments of this disclosure, in the touch detection time period (Touch), in order to avoid generation of the ground capacitance between the respective signal lines in the pixel circuit of the electroluminescent display panel and the self-capacitive electrodes 101 thereby influencing accuracy of the touch detection, in specific implementation, as shown in FIG. 4 and FIG. 5, a synchronization signal of the same amplitude as the first touch detection signal can be applied to the pixel circuit (e.g., the gate line 202 and the data line 203) in the electroluminescent display panel 200 in the touch detection time period. In this way, the ground capacitance between the signal lines in the pixel circuit and the self-capacitive electrodes 101 can be eliminated, which is convenient for improving accuracy of the touch detection.

At step S302 in the above driving method provided by embodiments of this disclosure, in the pressure detection time period (Force), the touch detection chip applies a second touch detection signal to the self-capacitive electrodes 101 or the cathode 201, here the change of distance between a self-capacitive electrode 101 and the cathode 201 caused by touch and press will influence charge and discharge of the capacitive structure formed between the two, hence, the pressure in the z direction perpendicular to the touch screen surface can be detected by detecting the change of the capacitance value of the capacitance formed between each self-capacitive electrode 101 and the cathode 201, so as to achieve the pressure sensing function.

Specifically, the step S302 in the above driving method provided by embodiments of this disclosure can be carried out in the following four ways:

The first way: as shown in FIG. 4, the specific way of applying a second touch detection signal to the self-capacitive electrodes 101 or the cathode 201 at step S302 can be: applying a second touch detection signal to the cathode 201, and applying a fixed value signal to the self-capacitive electrodes 101 simultaneously; correspondingly, the specific way of detecting changes of capacitance values of the capacitances formed between the self-capacitive electrodes 101 and the cathode 201 in step S302 can be: detecting change of signal amount of each self-capacitive electrode 101. In this way, the change of distance between a self-capacitive electrode 101 and the cathode 201 caused by touch and press will bring charge and discharge of the capacitive structure formed between the two, hence, the change amount of the capacitance values of the capacitances formed between the self-capacitive electrodes 101 and the cathode 201 can be determined by detecting the change of the signal amount of each self-capacitive electrode 101 using the principle of mutual capacitance detection, so as to calculate the pressure. Specifically, the touch pressure can be determined in the following way: determining the touch pressure based on a difference between a change of signal amount of the self-capacitive electrode detected in the pressure detection time period and a change of signal amount of the self-capacitive electrode detected in the touch detection time period.

Further, in the first way, in order to avoid generation of the ground capacitance between the gate line 102 and the data line 103 in the array substrate and the self-capacitive electrodes 101 in the pressure detection time period thereby influencing accuracy of pressure sensing, as shown in FIG. 4, in the pressure detection time period, the gate line 102 and the data line 103 in the array substrate can be applied with a same fixed value signal as the self-capacitance electrode. In this way, the ground capacitance between the gate line 102 and the data line 103 and the self-capacitive electrodes 101 can be eliminated, which is convenient for improving accuracy of pressure sensing.

Further, in the first way, in order to avoid generation of the ground capacitance between the respective signal lines in the pixel circuit of the electroluminescent display panel and the self-capacitive electrodes 101 thereby influencing accuracy of pressure sensing, as shown in FIG. 4, in the pressure detection time period, a synchronization signal of a same amplitude as the second detection signal can be applied to the pixel circuit (e.g., the gate line 102 and the data line 103) in the electroluminescent display panel. In this way, the ground capacitance between the signal lines in the pixel circuit and the self-capacitive electrodes 101 can be eliminated, which is convenient for improving accuracy of pressure sensing.

The second way: as shown in FIG. 5, the specific way of applying a second touch detection signal to the self-capacitive electrodes 101 or the cathode 201 at step S302 can be: applying a second touch detection signal to the self-capacitive electrodes 101, and applying a fixed value signal to the cathode 201 simultaneously; correspondingly, the specific way of detecting changes of capacitance values of the capacitances formed between the self-capacitive electrodes 101 and the cathode 201 in step S302 can be: detecting change of signal amount of each self-capacitive electrode 101. In this way, the change of distance between a self-capacitive electrode 101 and the cathode 201 caused by touch and press will bring charge and discharge of the capacitive structure formed between the two, the influence caused by the charge and discharge process will be counted into the detected signal amount of the self-capacitive electrode 101. Assume that the detected signal amount obtained here is b, and assume that the detected signal amount of the self-capacitive electrode 101 detected via the capacitance generated between the finger and the self-capacitive electrode 101 in the touch detection time period (Touch) is a, thus, the detected signal amount generated due to the pressure is f=b−a. Specifically, the touch pressure can be determined in the following way: determining the touch pressure based on a difference between a change of signal amount of the self-capacitive electrode detected in the pressure detection time period and a change of signal amount of the self-capacitive electrode detected in the touch detection time period. The larger the f is, the larger the pressure value it indicates, thus the pressure value can be determined through the above way.

Further, in the second way, in order to avoid generation of the ground capacitance between the gate line 102 and the data line 103 in the array substrate and the self-capacitive electrodes 101 in the pressure detection time period thereby influencing accuracy of pressure sensing, in specific implementation, as shown in FIG. 5, a synchronization signal of the same amplitude as the second touch detection signal can be applied to the gate line 102 and the data line 103 in the array substrate in the pressure detection time period. In this way, the ground capacitance between the gate line 102 and the data line 103 and the self-capacitive electrodes 101 can be eliminated, which is convenient for improving accuracy of pressure sensing.

Further, in the second way, in order to avoid generation of the ground capacitance between the respective signal lines in the pixel circuit of the electroluminescent display panel and the self-capacitive electrodes 101 thereby influencing accuracy of pressure sensing, as shown in FIG. 5, the pixel circuit (e.g., the gate line 202 and the data line 203) in the electroluminescent display panel can be applied with a same fixed value signal as the cathode. In this way, the ground capacitance between the signal lines in the pixel circuit and the self-capacitive electrodes 101 can be eliminated, which is convenient for improving accuracy of pressure sensing.

In embodiments, the cathode 201 of the electroluminescent display panel 200 in the touch display device using the above two ways generally uses a surface electrode structure, i.e., the cathode 201 is a non-patterned surface electrode. Certainly, the cathode 201 can also use the block electrode, which will not be defined here.

In the touch display device provided by embodiments of this disclosure, the cathode 201 in the electroluminescent display panel 200 can be a plurality of block electrodes. Moreover, the plurality of block electrodes and the self-capacitive electrodes 101 are in one-to-one correspondence, and their orthographic projections on a horizontal plane overlap with each other.

The following two ways show the ways of carrying out step S302 in the above driving method provided by embodiments of this disclosure when the cathode 201 uses the block electrode.

The third way: as shown in FIG. 5, the specific way of applying a second touch detection signal to the self-capacitive electrodes 101 or the cathode 201 in step S302 can be: applying a second touch detection signal to the self-capacitive electrodes 101; and applying a fixed value signal to the cathode 201 simultaneously; correspondingly, the specific way of detecting changes of capacitance values of the capacitances formed between the self-capacitive electrodes 101 and the cathode 201 in step S302 can be: detecting change of signal amount of each cathode 201. In this way, the change of distance between a self-capacitive electrode 101 and the cathode 201 caused by touch and press will bring charge and discharge of the capacitive structure formed between the two, hence, the change amount of the capacitance values of the capacitances formed between the self-capacitive electrodes 101 and the cathode 201 can be determined by detecting the change of the signal amount of each cathode 201 using the principle of mutual capacitance detection, so as to calculate the pressure.

Further, in the third way, in order to avoid generation of the ground capacitance between the gate line 102 and the data line 103 in the array substrate and the self-capacitive electrodes 101 in the pressure detection time period thereby influencing accuracy of pressure sensing, as shown in FIG. 5, the synchronization signal of a same amplitude as the second touch detection signal can be applied to the gate line 102 and the data line 103 in the array substrate in the pressure detection time period. In this way, the ground capacitance between the gate line 102 and the data line 103 and the self-capacitive electrodes 101 can be eliminated, which is convenient for improving accuracy of pressure sensing.

Further, in the third way, in order to avoid generation of the ground capacitance between the respective signal lines in the pixel circuit of the electroluminescent display panel and the self-capacitive electrodes 101 thereby influencing accuracy of pressure sensing, as shown in FIG. 5, the pixel circuit (e.g., the gate line 202 and the data line 203) in the electroluminescent display panel can be applied with a same fixed value signal as the cathode in the pressure detection time period. In this way, the ground capacitance between the signal lines in the pixel circuit and the to self-capacitive electrodes 101 can be eliminated, which is convenient for improving accuracy of pressure sensing.

The fourth way: as shown in FIG. 4, the specific way of applying a second touch detection signal to the self-capacitive electrodes 101 or the cathode 201 in step S302 can be: applying a second touch detection signal to the cathode 201; and applying a fixed value signal to the self-capacitive electrodes 101 simultaneously; correspondingly, the specific way of detecting changes of capacitance values of the capacitances formed between the self-capacitive electrodes 101 and the cathode 201 in step S302 can be: detecting change of signal amount of each cathode 201. In this way, the change of distance between a self-capacitive electrode 101 and the cathode 201 caused by touch and press will bring charge and discharge of the capacitive structure formed between the two, hence, the change amount of the capacitance values of the capacitances formed between the self-capacitive electrodes 101 and the cathode 201 can be determined by detecting the change of the signal amount of each cathode 201 using the principle of mutual capacitance detection, so as to calculate the pressure.

Further, in the fourth way, in order to avoid generation of the ground capacitance between the gate line 102 and the data line 103 in the array substrate and the self-capacitive electrodes 101 in the pressure detection time period thereby influencing accuracy of pressure sensing, as shown in FIG. 4, the gate line 102 and the data line 103 in the array substrate can be applied with a same fixed value signal as the self-capacitive electrodes in the pressure detection time period. In this way, the ground capacitance between the gate line 102 and the data line 103 and the self-capacitive electrodes 101 can be eliminated, which is convenient for improving accuracy of pressure sensing.

Further, in the fourth way, in order to avoid generation of the ground capacitance between the respective signal lines in the pixel circuit of the electroluminescent display panel and the self-capacitive electrodes 101 thereby influencing accuracy of pressure sensing, as shown in FIG. 4, a synchronization signal of a same amplitude as the second touch detection signal can be applied to the pixel circuit (e.g., the gate line 202 and the data line 203) in the electroluminescent display panel in the pressure detection time period. In this way, the ground capacitance between the signal lines in the pixel circuit and the self-capacitive electrodes 101 can be eliminated, which is convenient for improving accuracy of pressure sensing.

Figure 6:
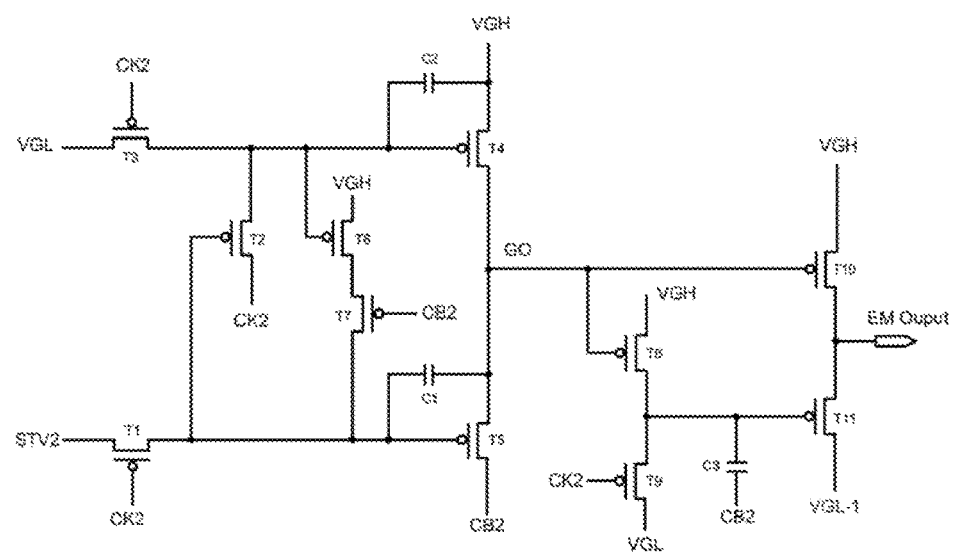
FIG. 6 is a schematic structural view of a circuit of outputting an emission control signal provided by an embodiment of this disclosure.

Further, in the electroluminescent display panel of the touch display device provided by embodiments of this disclosure, the case of having to apply a synchronization signal to the pixel circuit exists in either the touch detection time period or the pressure detection time period. Hence, embodiments of this disclosure further provide an emission control signal circuit for providing an emission control signal EM to a pixel circuit, which circuit can provide a synchronization signal based on the emission control signal EM at the required moment. As shown in FIG. 6, the circuit comprises:

a first thin film transistor T1, a first terminal of which is inputted with a second frame start signal STV2 for the scanning, a control terminal of which is inputted with a second clock signal CK2;

a second thin film transistor T2, a first terminal of which is inputted with a second clock signal CK2, a control terminal thereof is connected to the second terminal of the first thin film transistor T1;

a third thin film transistor T3, a first terminal of which is connected to a negative power input pin (the input pin labeled by VGL in the figure), a control terminal of which is inputted with a second clock signal CK2;

a fourth thin film transistor T4, a first terminal of which is connected to a positive power input pin (the input pin labeled by VGH in the figure), a control terminal of which is connected to the second terminal of the third thin film transistor T3 and the second terminal of the second thin film transistor T2;

a fifth thin film transistor T5, a first terminal of which is inputted with a second control signal CB2 with an opposite phase from the second clock signal CK2, a control terminal of which is connected to the second terminal of the first thin film transistor T1, a second terminal of which and the second terminal of the fourth thin film transistor T4 are connected together and form a first output terminal GO;

a sixth thin film transistor T6, a first terminal of which is connected to a positive power input pin, a control terminal of which is connected with the second terminal of the third thin film transistor T3 and the second terminal of the second thin film transistor T2;

a seventh thin film transistor T7, a first terminal of which is connected with the second terminal of the sixth thin film transistor T6, a control terminal of which is inputted with a second control signal CB2, a second terminal of which is connected with the second terminal of the first thin film transistor T1 and the control terminal of the fifth thin film transistor T5;

a first capacitor C1, two terminals of which are connected with the control terminal and the second terminal of the fifth thin film transistor T5 respectively;

a second capacitor C2, two terminals of which are connected with the control terminal and the first terminal of the fourth thin film transistor T4 respectively;

an eighth thin film transistor T8, a first terminal of which is connected to a positive power input pin, a control terminal of which is connected to the first output terminal;

a ninth thin film transistor T9, a first terminal of which is connected to a negative power input pin, a control terminal of which is inputted with a second control signal CB2, a second terminal of which is connected with the second terminal of the eighth thin film transistor T8;

a tenth thin film transistor T10, a first terminal of which is connected to a positive power input pin, a control terminal of which is connected to the first output terminal GO;

an eleventh thin film transistor T11, a first terminal of which is connected to a second negative power input pin (the input pin labeled by VGL-1 in the figure), a control terminal of which is connected to the second terminal of the eighth thin film transistor T8 and the second terminal of the ninth thin film transistor T9, a second terminal of which and the second terminal of the tenth thin film transistor T10 are connected together and form an output terminal (EM Output) for outputting an emission control signal;

a third capacitor C3, one terminal of which is connected with the second terminals of the eighth and ninth thin film transistors T8, T9 and the control terminal of the eleventh thin film transistor T11, the other terminal of which is inputted with a second control signal CB2.

Figure 7:
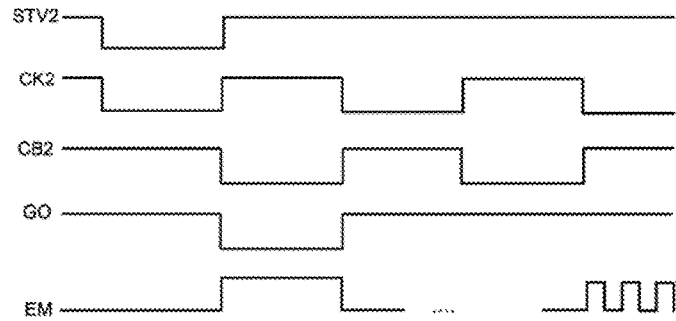
FIG. 7 is a working timing diagram of the circuit as shown in FIG. 6.
Figure 8:
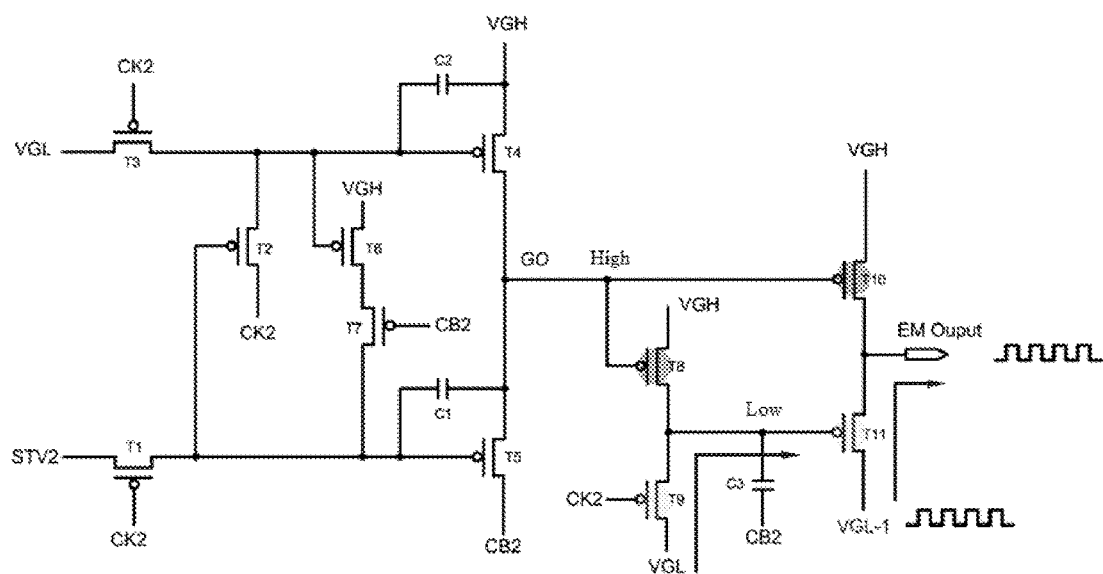
FIG. 8 is a schematic working process diagram when the circuit as shown in FIG. 6 needs to emit a synchronization signal.

FIG. 7 shows the driving timing of the circuit for outputting an emission control signal EM as shown in FIG. 6. When it is not required to emit a synchronization signal, the second negative power input pin (the input pin labeled by VGL-1 in the figure) is inputted with a second negative power signal, the working process is similar as the prior art, which will not be repeated here. When it is required to emit a synchronization signal, the second negative power input pin is inputted with a synchronization driving signal. Here, the EM signal is superposed with a touch driving signal on the basis of the original low voltage, i.e., outputting a synchronization driving signal so as to meet the requirement of synchronization driving, specifically as shown in FIG. 8.

The above circuit provided by this embodiment achieves synchronization driving of the emission control signal, which facilitates synchronization driving of the pixel circuit, ensures that the output current of the OLED is not changed, and enables the display effect not to be influenced while achieving the touch function.

The touch display device provided by embodiments of this disclosure comprises a liquid crystal display panel with self-capacitive electrodes for black and white display, and an electroluminescent display panel arranged under the liquid crystal display panel for color display. The self-capacitive electrodes in the liquid crystal display panel and the cathode in the electroluminescent display panel constitute capacitive structures. When it is pressed at the position where a self-capacitive electrode in the liquid crystal display panel is, the distance between the self-capacitive electrode and the cathode that constitute the capacitive structure changes, then, the capacitance between the two changes, and thus the function of pressure sensing is achieved. Such a solution makes less modification to the structural design of the touch display device, and will not be limited by assembly tolerance, which is benefit to achieve better detection accuracy and save the manufacturing cost. In the touch detection time period, a first touch detection signal is applied to the self-capacitive electrodes and the cathode simultaneously. Here, the change of the distance between a self-capacitive electrode and the cathode caused by touch and press will not bring charge and discharge of the capacitive structure constituted between the two, i.e., the first touch detection signal will not be influenced. Hence, the touch position can be determined by detecting the change of the capacitance value of the self-capacitance corresponding to each self-capacitive electrode based on the detection principle of the self-capacitance, so as to achieve the touch detection function. In the pressure detection time period, a second touch detection signal is applied to the self-capacitive electrodes or the cathode. Here, the change of distance between the a self-capacitive electrode and the cathode caused by touch and press will bring charge and discharge of the capacitive structure constituted between the two, i.e., the second touch detection signal will be influenced. Hence, the pressure at the touch position can be determined by detecting the changes of the capacitance values of the capacitances formed between the self-capacitive electrodes and the cathode, so as to achieve the pressure sensing function.

Apparently, the skilled person in the art can make various amendments and modifications to the embodiments of this disclosure without departing from the spirit and the scope of the present disclosure. In this way, provided that these amendments and modifications of the present disclosure belong to the scopes of the claims attached and the equivalent technologies thereof, the present disclosure also intends to encompass these amendments and modifications.

The invention claimed is:

1. A driving method of a touch display device, wherein the touch display device comprises a liquid crystal display panel having a plurality of self-capacitive electrodes for performing black and white display, and an electroluminescent display panel arranged under the liquid crystal display panel for performing color display, the self-capacitive electrodes in the liquid crystal display panel and a cathode in the electroluminescent display panel constitute capacitive structures; the driving method comprising:

in a touch detection time period, applying a first touch detection signal to the self-capacitive electrodes and the cathode simultaneously, and detecting change of a capacitance value of a self capacitance corresponding to each self-capacitive electrode so as to determine a touch position;

in a pressure detection time period, applying a second touch detection signal to the self-capacitive electrodes or the cathode, and detecting changes of capacitance values of capacitances formed between the self-capacitive electrodes and the cathode so as to determine a pressure at the touch position.

2. The driving method as claimed in claim 1, further comprising: in the touch detection time period, applying a synchronization signal of a same amplitude as the first touch detection signal to a gate line and a data line in the liquid crystal display panel, and applying a synchronization signal of a same amplitude as the first touch detection signal to a pixel circuit in the electroluminescent display panel.

3. The driving method as claimed in claim 1, wherein applying a second touch detection signal to the self-capacitive electrodes or the cathode comprises applying a second touch detection signal to the cathode, and applying a fixed value signal to the self-capacitive electrodes simultaneously; and detecting changes of capacitance values of capacitances formed between the self-capacitive electrodes and the cathode comprises detecting change of signal amount of each of the self-capacitive electrodes.

4. The driving method as claimed in claim 3, further comprising: in the pressure detection time period, applying a same fixed value signal to the gate line and the data line in the liquid crystal display panel as the self-capacitive electrodes.

5. The driving method as claimed in claim 3, further comprising: in the pressure detection time period, applying a synchronization signal of a same amplitude as the second touch detection signal to a pixel circuit in the electroluminescent display panel.

6. The driving method as claimed in claim 3, wherein determining a touch pressure comprises determining the touch pressure based on a difference between the change of signal amount of the self-capacitive electrode detected in the pressure detection time period and the change of signal amount of the self-capacitive electrode detected in the touch detection time period.

7. The driving method as claimed in claim 1, wherein applying a second touch detection signal to the self-capacitive electrodes or the cathode comprises applying a fixed value signal to the cathode, and applying a second touch detection signal to the self-capacitive electrodes simultaneously; and
 detecting changes of capacitance values of capacitances formed between the self-capacitive electrodes and the cathode comprises detecting change of signal amount of each of the self-capacitive electrodes.

8. The driving method as claimed in claim 7, further comprising: in the pressure detection time period, applying a synchronization signal of a same amplitude as the second touch detection signal to the gate line and the data line in the liquid crystal display panel.

9. The driving method as claimed in claim 7, further comprising: in the pressure detection time period, applying a same fixed value signal to a pixel circuit in the electroluminescent display panel as the cathode.

10. The driving method as claimed in claim 7, wherein determining a touch pressure comprises determining the touch pressure based on a difference between the change of signal amount of the self-capacitive electrode detected in the pressure detection time period and the change of signal amount of the self-capacitive electrode detected in the touch detection time period.

11. The driving method as claimed in claim 1, wherein the cathode in the electroluminescent display panel is a plurality of block electrodes; and the block electrodes and the self-capacitive electrodes are in one-to-one correspondence, and their orthographic projections on a horizontal plane overlap with each other; and wherein,
 applying a second touch detection signal to the self-capacitive electrodes or the cathode comprises applying a second touch detection signal to the self-capacitive electrodes, and applying a fixed value signal to the cathode simultaneously; and
 detecting changes of capacitance values of capacitances formed between the self-capacitive electrodes and the cathode comprises detecting change of signal amount of each of the block electrodes.

12. The driving method as claimed in claim 11, further comprising: in the pressure detection time period, applying a synchronization signal of a same amplitude as the second touch detection signal to the gate line and the data line in the liquid crystal display panel.

13. The driving method as claimed in claim 11, further comprising: in the pressure detection time period, applying a same fixed value signal to a pixel circuit in the electroluminescent display panel as the cathode.

14. The driving method as claimed in claim 1, wherein the cathode in the electroluminescent display panel is a plurality of block electrodes; and the block electrodes and the self-capacitive electrodes are in one-to-one correspondence, and their orthographic projections on a horizontal plane overlap with each other; and wherein,
 applying a second touch detection signal to the self-capacitive electrodes or the cathode comprises applying a fixed value signal to the self-capacitive electrodes, and applying a second touch detection signal to the cathode simultaneously; and
 detecting changes of capacitance values of capacitances formed between the self-capacitive electrodes and the cathode comprises detecting change of signal amount of each of the block electrodes.

15. The driving method as claimed in claim 14, further comprising: in the pressure detection time period, applying a same fixed value signal to the gate line and the data line in the liquid crystal display panel as the self-capacitive electrodes.

16. The driving method as claimed in claim 14, further comprising: in the pressure detection time period, applying a synchronization signal of a same amplitude as the second touch detection signal to a pixel circuit in the electroluminescent display panel.

17. A touch display device comprising:
 a liquid crystal display panel having a plurality of self-capacitive electrodes for performing black and white display;
 an electroluminescent display panel arranged under the liquid crystal display panel for performing color display, wherein the self-capacitive electrodes in the liquid crystal display panel and a cathode in the electroluminescent display panel constitute capacitive structures;
 a touch detection chip configured to in a touch detection time period, apply a first touch detection signal to the self-capacitive electrodes and the cathode simultaneously, and detect change of a capacitance value of a self capacitance corresponding to each self-capacitive electrode so as to determine a touch position; in a pressure detection time period, apply a second touch detection signal to the self-capacitive electrodes or the cathode, and detect changes of capacitance values of capacitances formed between the self-capacitive electrodes and the cathode so as to determine a pressure at the touch position.

18. The touch display device as claimed in claim 17, wherein the cathode in the electroluminescent display panel is a plurality of block electrodes; and the plurality of block electrodes and the self-capacitive electrodes are in one-to-one correspondence, and their orthographic projections on a horizontal plane overlap with each other.

* * * * *